United States Patent
Nelson (10) Patent No.: US 12,479,416 B2
(45) Date of Patent: Nov. 25, 2025

(54) MULTI-WHEEL DRIVE HYBRID VEHICLE WITH MULTI-MODE FUNCTIONALITY

(71) Applicant: Cummins Inc., Columbus, IN (US)

(72) Inventor: Christopher R. Nelson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 197 days.

(21) Appl. No.: 18/226,177

(22) Filed: Jul. 25, 2023

(65) Prior Publication Data

US 2024/0034299 A1 Feb. 1, 2024

Related U.S. Application Data

(60) Provisional application No. 63/393,517, filed on Jul. 29, 2022.

(51) Int. Cl.
*B60W 20/15* (2016.01)
*B60K 6/52* (2007.10)
(Continued)

(52) U.S. Cl.
CPC .............. *B60W 20/15* (2016.01); *B60K 6/52* (2013.01); *B60K 17/356* (2013.01);
(Continued)

(58) Field of Classification Search
CPC .............. B60W 20/15; B60W 10/119; B60W 2530/10; B60K 6/52; B60K 17/356; B60Y 2200/92; B60Y 2400/82
See application file for complete search history.

(56) References Cited

U.S. PATENT DOCUMENTS

| 7,338,335 | B1 | 3/2008 | Messano | |
| 2005/0000739 | A1* | 1/2005 | Leclerc | B60K 6/48 903/951 |

(Continued)

FOREIGN PATENT DOCUMENTS

| DE | 102016220905 A1 | 4/2018 |
| EP | 2394889 B1 | 12/2011 |

(Continued)

*Primary Examiner* — Naeem Taslim Alam
(74) *Attorney, Agent, or Firm* — Faegre Drinker Biddle & Reath LLP (57) ABSTRACT

Methods and systems implementing hybrid vehicle with multi-mode functionality are provided. The vehicle includes a steerable front axle coupled with a first motive power source having an integrated axle including an electric motor and a transmission. A rear axle is coupled with a second motive power source and separately operable from the steerable front axle. A sensor measures an additional load applied on the vehicle. A controller coupled with the sensor, the first motive power source, and the second motive power source. The controller receives measurement data from the sensor; selects, based on the measurement data, (a) a first operation mode of activating only the first motive power source or (b) a second operation mode of activating only the second motive power source, to operate the vehicle; and activates, based on the first operation mode or the second operation mode that is selected, the first motive power source or the second motive power source to operate the vehicle.

20 Claims, 8 Drawing Sheets

(51) Int. Cl.
*B60K 17/356* (2006.01)
*B60W 10/119* (2012.01)

(52) U.S. Cl.
CPC ....... *B60W 10/119* (2013.01); *B60W 2530/10* (2013.01); *B60Y 2200/92* (2013.01); *B60Y 2400/82* (2013.01)

(56) References Cited

U.S. PATENT DOCUMENTS

| | | | |
|---|---|---|---|
| 2016/0101700 A1* | 4/2016 | Brown | B60L 15/20 701/22 |
| 2017/0050536 A1* | 2/2017 | Martin | B60K 17/356 |
| 2018/0244257 A1* | 8/2018 | Kneitz | B60W 10/06 |
| 2018/0251131 A1* | 9/2018 | Doering | B60W 20/10 |
| 2020/0102004 A1* | 4/2020 | Yamazaki | B62D 15/021 |
| 2021/0053448 A1* | 2/2021 | Beck | B60W 50/00 |
| 2023/0001785 A1* | 1/2023 | Gebhard | B60K 17/02 |
| 2023/0242131 A1* | 8/2023 | Kasaiezadeh Mahabadi | G06Q 10/06311 701/29.1 |

FOREIGN PATENT DOCUMENTS

| | | |
|---|---|---|
| ES | 2629088 B1 | 8/2017 |
| FR | 2854122 B1 | 10/2004 |
| WO | 2013076607 A1 | 5/2013 |
| WO | 2016116655 A1 | 7/2016 |
| WO | 2020169919 A1 | 8/2020 |

\* cited by examiner

MULTI-WHEEL DRIVE HYBRID VEHICLE WITH MULTI-MODE FUNCTIONALITY

CROSS REFERENCE TO RELATED APPLICATION

This application claims the benefit of U.S. Provisional Application No. 63/393,517, filed Jul. 29, 2022, which is incorporated by reference herein in its entirety for all purposes.

FIELD OF THE DISCLOSURE

The present disclosure relates generally to hybrid vehicles, especially to drivetrains of hybrid vehicles having multiple modes of operation.

BACKGROUND OF THE DISCLOSURE

Some vehicles include a mechanical power source in the form of an engine combined with a motor generator, known as a hybrid vehicle. In some situations, driving the vehicle using both the engine and the motor generator is desirable, whereas in other situations, the engine or the motor generator may be deactivated such that the vehicle runs on only one instead of both of the mechanical power sources. The combination of the engine and automatic transmission with the motor generator, and the provision of a center differential gear, makes it possible to realize four-wheel drive (4WD).

Figure 1:
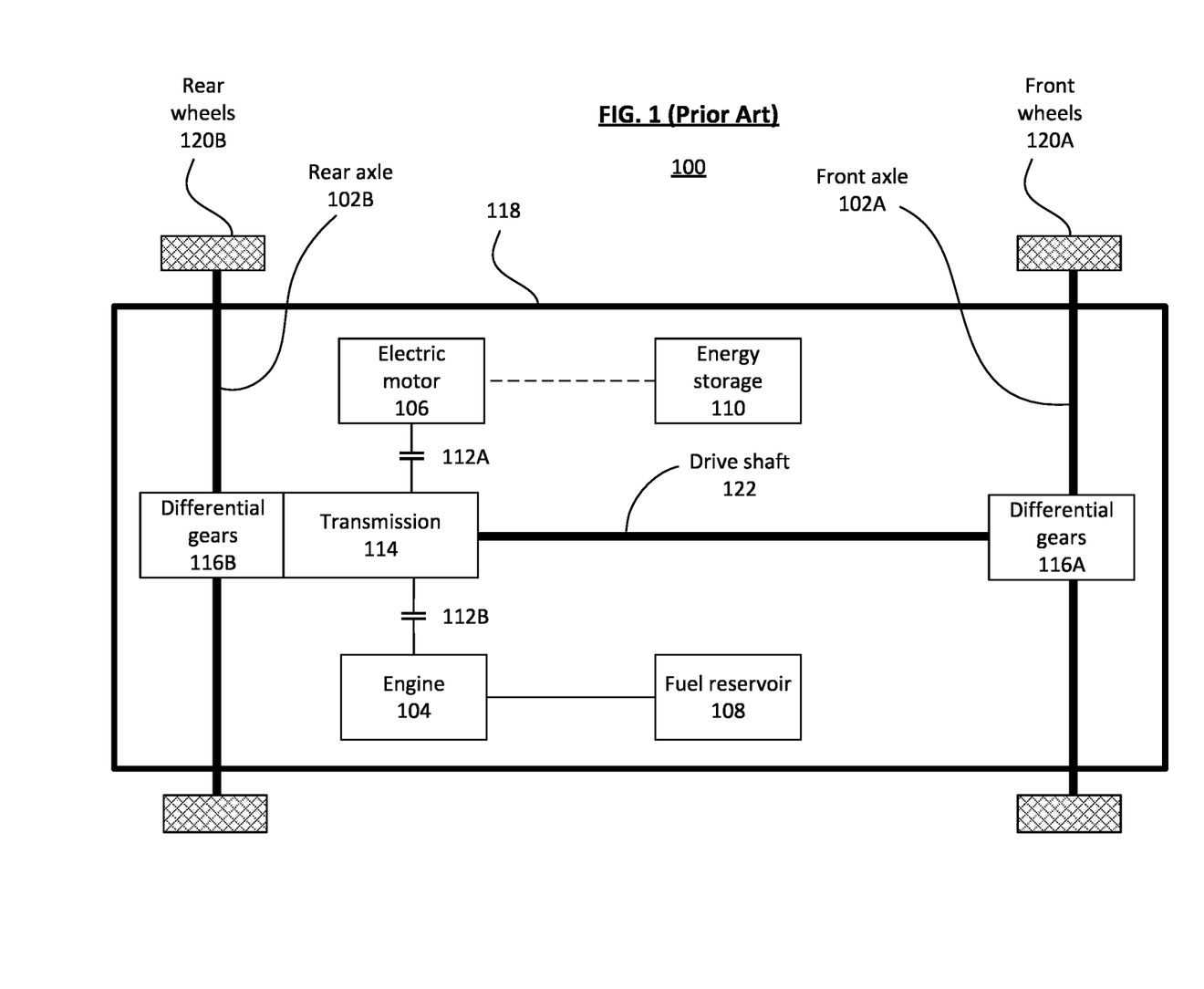
FIG. 1 is a schematic diagram of a hybrid vehicle system as known in the art.

FIG. 1 shows an example of a prior-art hybrid vehicle that uses a hybrid system 100. The hybrid system 100 is a parallel hybrid system, which incorporates within its frame 118 a battery or energy storage 110 that is electrically coupled to an electric motor 106 via a converter (not shown). The system 100 also includes a fuel reservoir 108 such as a gas tank fluidly coupled to an engine 104. In all figures shown herein, solid lines indicate mechanical connections, while broken lines indicate electrical connections (e.g., electrical communication lines). Both the electric motor 106 and the engine 104 provide mechanical power to a transmission 114, which is coupled to both and can be connected or disconnected via clutches 112A and 112B, and the mechanical power causes the differential gears 116 to move the wheels 120, thus driving the vehicle. The system 100 also includes two differential gears 116A and 116B, which are mechanically coupled with axles 102 such as a front axle 102A and a rear axle 102B, respectively. Each axle is attached to a pair of wheels (front axle 102A with the front wheels 120A and rear axle 102B with the rear wheels 120B) as shown. A drive shaft 122 mechanically couples the transmission 114 with the differential gears 116.

SUMMARY

Various embodiments of the present disclosure relate to methods and systems for a hybrid powertrain. According to some embodiments, a vehicle includes a steerable front axle mechanically coupled with a first motive power source comprising an integrated axle including an electric motor and a transmission operatively coupled with the steerable front axle; at least one rear axle mechanically coupled with a second motive power source and separately operable from the steerable front axle; a sensor configured to measure an additional load applied on the vehicle; and a controller operatively coupled with the sensor, the first motive power source, and the second motive power source. The controller includes a processing unit and a non-transitory memory storage medium having stored thereon instructions that, when executed by the processing unit, cause the processing unit to: receive measurement data from the sensor; select, based on the measurement data, (a) a first operation mode of activating only the first motive power source or (b) a second operation mode of activating only the second motive power source, to operate the vehicle; and activate, based on the first operation mode or the second operation mode that is selected, the first motive power source or the second motive power source to operate the vehicle.

In some examples, the instructions, when executed by the processing unit, further cause the processing unit to: in response to determining, based on the measurement data, that the additional load applied on the vehicle is equal to or greater than a threshold value, select (b) the second operation mode. In some examples, the instructions, when executed by the processing unit, further cause the processing unit to: receive information indicative of whether the second motive power source is approaching or reaching a performance limit in response to operating in the second operation mode; select, based on the information that is received, (c) a third operation mode of activating both the first and second motive power sources; and activate both the first and second motive power sources to operate the vehicle. In some examples, the instructions, when executed by the processing unit, further cause the processing unit to: receive a user input requesting additional power to operate the vehicle; select, based on the user input that is received, (c) a third operation mode of activating both the first and second motive power sources; and activate both the first and second motive power sources to operate the vehicle.

In some examples, the second motive power source comprises an engine and a second transmission coupled with the at least one rear axle. In some examples, the second motive power source comprises a second integrated axle including a second electric motor and a second transmission operatively coupled with the at least one rear axle. In some examples, the at least one rear axle includes at least a first rear axle and a second rear axle. In some examples, the first rear axle is mechanically coupled with the second motive power source and the second rear axle is mechanically coupled with a third motive power source. In some examples, the second motive power source comprises an engine and a second transmission coupled with the first rear axle, and the third motive power source comprises a second integrated axle including a second electric motor and a third transmission operatively coupled with the second rear axle.

In some examples, the second motive power source comprises a second integrated axle including a second electric motor and a second transmission operatively coupled with the first rear axle, and the third motive power source comprises a third integrated axle including a third electric motor and a third transmission operatively coupled with the second rear axle. In some examples, the second motive power source comprises an engine and a second transmission coupled with the first rear axle, and the first rear axle is mechanically coupled with the second rear axle via a drive shaft.

According to some embodiments, a method of operating a vehicle includes: receiving, by a controller of the vehicle, measurement data from a sensor configured to measure an additional load applied on the vehicle; selecting, by the controller based on the measurement data, (a) a first operation mode of activating only a first motive power source or (b) a second operation mode of activating only a second motive power source, to operate the vehicle. The first motive power source is mechanically coupled with a steerable front axle of the vehicle and comprises an integrated axle including an electric motor and a transmission operatively coupled with the steerable front axle, and the second motive power source is mechanically coupled with at least one rear axle of the vehicle and is separately operable from the steerable front axle. The method also includes activating, by the controller based on the first operation mode or the second operation mode that is selected, the first motive power source or the second motive power source to operate the vehicle.

In some examples, the method also includes: in response to determining, based on the measurement data, that the additional load applied on the vehicle is greater than a threshold value, selecting, by the controller, (b) the second operation mode. In some examples, the method also includes: receiving, by the controller, information indicative of whether the second motive power source is approaching or reaching a performance limit in response to operating in the second operation mode; selecting, by the controller based on the information that is received, (c) a third operation mode of activating both the first and second motive power sources; and activating, by the controller, both the first and second motive power sources to operate the vehicle. In some examples, the method also includes: receiving, by the controller, a user input requesting additional power to operate the vehicle; selecting, by the controller based on the user input that is received, (c) a third operation mode of activating both the first and second motive power sources; and activating, by the controller, both the first and second motive power sources to operate the vehicle.

According to some embodiments, a non-transitory memory storage medium may have stored thereon instructions that, when executed by a processing unit, cause the processing unit to perform any one of the aforementioned method examples. The processing unit is implemented in the controller.

According to some embodiments, a controller may be implemented to include a processing unit and a non-transitory memory storage medium having stored thereon instructions that, when executed by the processing unit, cause the processing unit to: receive measurement data from a sensor configured to measure an additional load applied on a vehicle; select, based on the measurement data, (a) a first operation mode of activating only a first motive power source that is mechanically coupled with a steerable front axle of the vehicle and comprises an integrated axle including an electric motor and a transmission operatively coupled with the steerable front axle, or (b) a second operation mode of activating only a second motive power source mechanically coupled with at least one rear axle that is separately operable from the steerable front axle, to operate the vehicle; and activate, based on the first operation mode or the second operation mode that is selected, the first motive power source or the second motive power source to operate the vehicle.

In some examples, the instructions, when executed by the processing unit, further cause the processing unit to: in response to determining, based on the measurement data, that the additional load applied on the vehicle is equal to or greater than a threshold value, select (b) the second operation mode. In some examples, the instructions, when executed by the processing unit, further cause the processing unit to: receive information indicative of whether the second motive power source is approaching or reaching a performance limit in response to operating in the second operation mode; select, based on the information that is received, (c) a third operation mode of activating both the first and second motive power sources; and activate both the first and second motive power sources to operate the vehicle. In some examples, the instructions, when executed by the processing unit, further cause the processing unit to: receive a user input requesting additional power to operate the vehicle; select, based on the user input that is received, (c) a third operation mode of activating both the first and second motive power sources; and activate both the first and second motive power sources to operate the vehicle.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and the disclosure itself will be better understood by reference to the following description of embodiments of the disclosure taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner. While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electromagnets, adhesives, friction grips, welds, snaps, clips, etc.

As utilized herein, terms "controller," "system," "interface," and the like are intended to refer to a computer-related entity, either hardware, software (e.g., algorithm, in execution), and/or firmware. For example, a controller can be a process running on a processor, the processor itself, a program, and/or a computer. By way of illustration, both an application running on a server and the server can be a controller. One or more controllers can reside within a processor and a controller can be localized on one computer and/or distributed between two or more computers.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

Figures 2, 3:
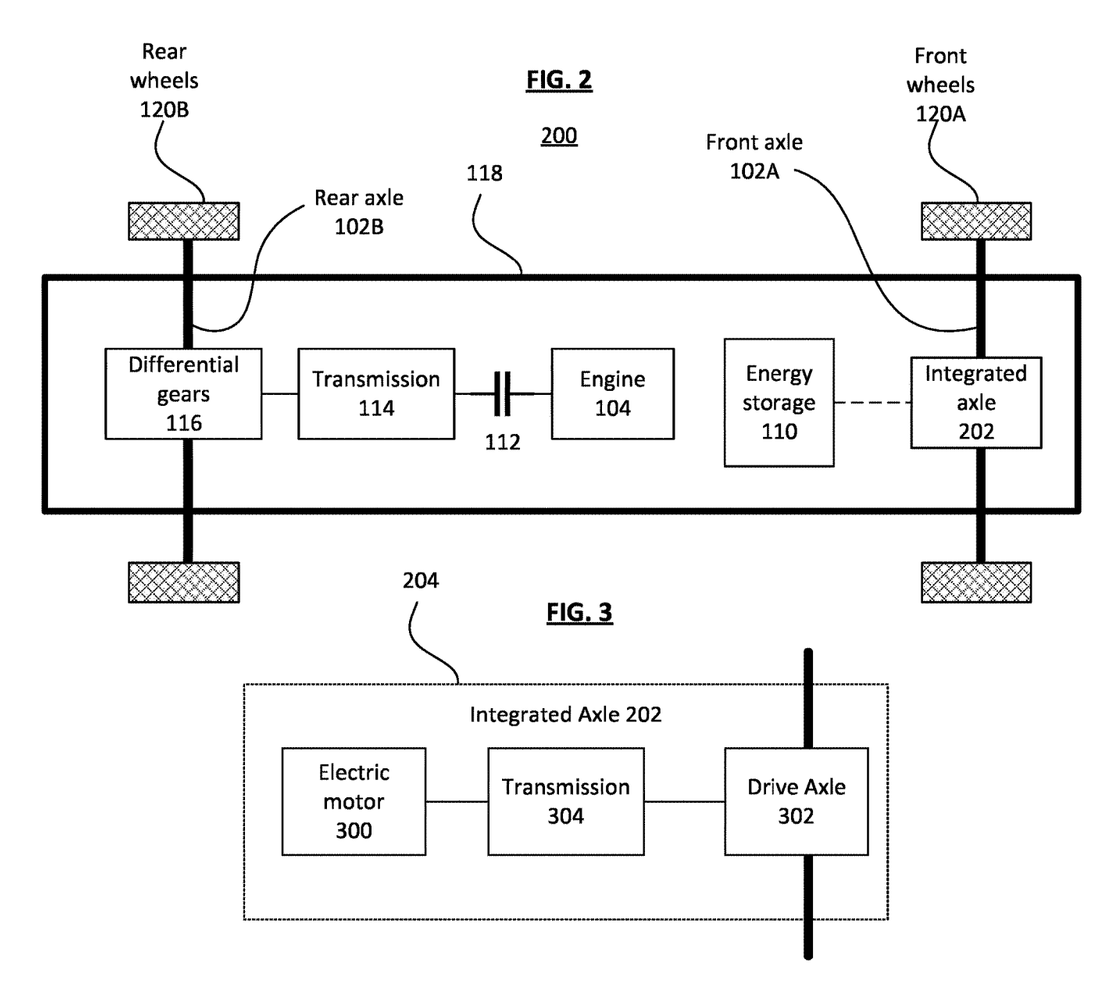
FIG. 2 is a schematic diagram of a dual-axle multi-mode adjustable hybrid vehicle system with integrated front axle, according to embodiments disclosed herein.
FIG. 3 is a schematic diagram of an integrated axle, according to embodiments disclosed herein.

FIG. 2 shows an example of a multi-mode hybrid vehicle system 200 as disclosed herein. The system 200 includes a plurality of motive power sources. For example, an integrated axle 202 is mechanically coupled with a steerable front axle 102A such that the integrated axle 202 is used as a motive power source to provide the motive force to drive the front wheels 120A using electrical energy provided form the energy storage 110. In some examples, the energy storage 110 may be or include one or more batteries. In some examples, the energy storage 110 may be or include one or more fuel cells. The rear axle 102B is mechanically coupled with the differential gears 116, which is mechanically coupled with the transmission 114, which is mechanically coupled with or decoupled from the engine 104 via the clutch 112. The rear axle 102B, therefore, is controlled using the motive force provided by the engine 104, another power motive source. For simplicity, the inverter(s) for the integrated axle 202 and the fuel reservoir 108 coupled with the engine 104 are not shown.

As disclosed herein, a "motive power source" may be a component capable of generating or providing motive power for the vehicle and may include, but are not limited to, any one or more of a battery-powered motor, a fuel cell-powered motor, and/or a fuel-powered engine, for example, as known in the art. As disclosed herein, an "integrated axle" includes a type of electric axle drive that is affixed to the wheels to rotate them. In examples, the integrated axle combines the functionality of an electric motor-generator, power electronics such as an inverter, and in some examples a cooling circuit to reduce cost and increase efficiency in a single component. Integrated axles are neither directly nor indirectly coupled with any suitable engine, including but not limited to combustion engines such as an internal combustion engine (ICE), thereby using solely the motor-generator included therein to provide mechanical power to a drive axle coupled thereto.

In some examples, the motor-generator of the integrated axle may be mounted on the drive axle. In some embodiments, the integrated axle is configured to reduce interfaces and components that may induce efficiency loss. Examples of such components include wires and copper cables that link the components together, plugs, bearings for rotating components, and separate cooling circuits for the electric motor and power electronics. The integrated axles are also more compact than the electric motor, the power electronics, and the cooling circuits therefor being individually installed, thus saving installation space within the chassis frames of the vehicle and allowing more room therein. Each integrated axle is configured independently of other integrated axle(s) in the system. In some examples, the integrated axle may also include a two-speed or three-speed gearbox.

As shown in the embodiment of FIG. 2, the integrated axle 202 is mechanically coupled with a drive axle 102, such as the front axle 102A as shown in FIG. 2. The drive axle 102 is mechanically coupled with a pair of wheels 120, such as the pair of front wheels 120A as shown in FIG. 2. Although not shown, a controller is electrically coupled with the integrated axle 202. Based on the inputs received, the controller turns on (activates or engages) or turns off (deactivates or disengages) one or more of these components to achieve the different modes shown herein. FIG. 3 shows some of the components of the integrated axle 202. For example, the integrated axle 202 includes an electric motor-generator 300, a drive axle 302, and a transmission 304. Other components such as the aforementioned inverter and/or cooling circuit may be included in the integrated axle 202, as suitable. These components are separately or independently operable from the other components (e.g., the transmission 304 is separately operable from the transmission 114). The components of the integrated axle 202 (e.g., the electric motor-generator and at least a portion of the drive axle, etc.) may be mechanically mated to, coupled to, affixed to, or implemented within a common housing 204. The housing may be any suitable structure which supports the positioning of the components, as well as to provide protection of the components.

Figure 4:
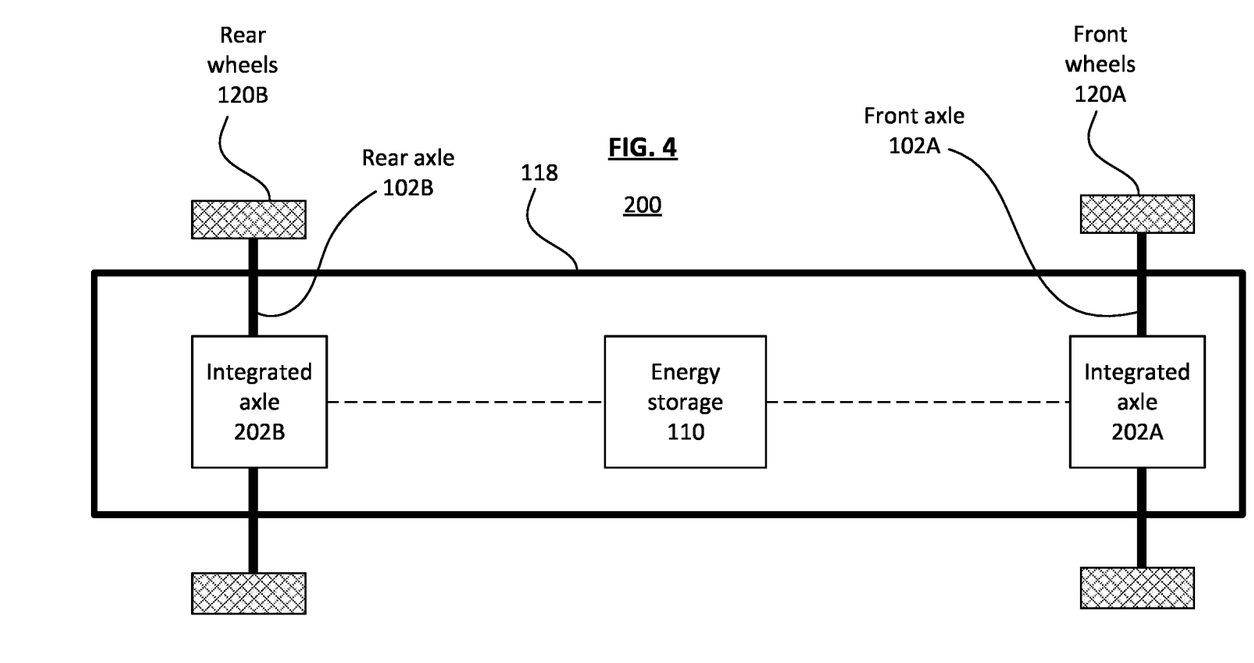
FIG. 4 is a schematic diagram of another dual-axle multi-mode adjustable hybrid vehicle system with integrated front axle, according to embodiments disclosed herein.

FIG. 4 shows an example of the system 200 which incorporates two integrated axles 202A and 202B, with one implemented for each of the front axle 102A and the rear axle 102B, respectively. The integrated axles 202A and 202B are operated using the controller (not shown) and the electrical energy for these axles are provided by a common energy storage 110, such as a battery or a battery pack. The two integrated axles 202A and 202B may be separately and independently operated so as to be implementable as two separate and distinct motive power sources. Each integrated axle may include the same components, including for example an electric motor and a transmission as explained herein, that are separately operable from each other, although they may be operable together simultaneously as well, as suitably controlled by the controller.

Figure 5:
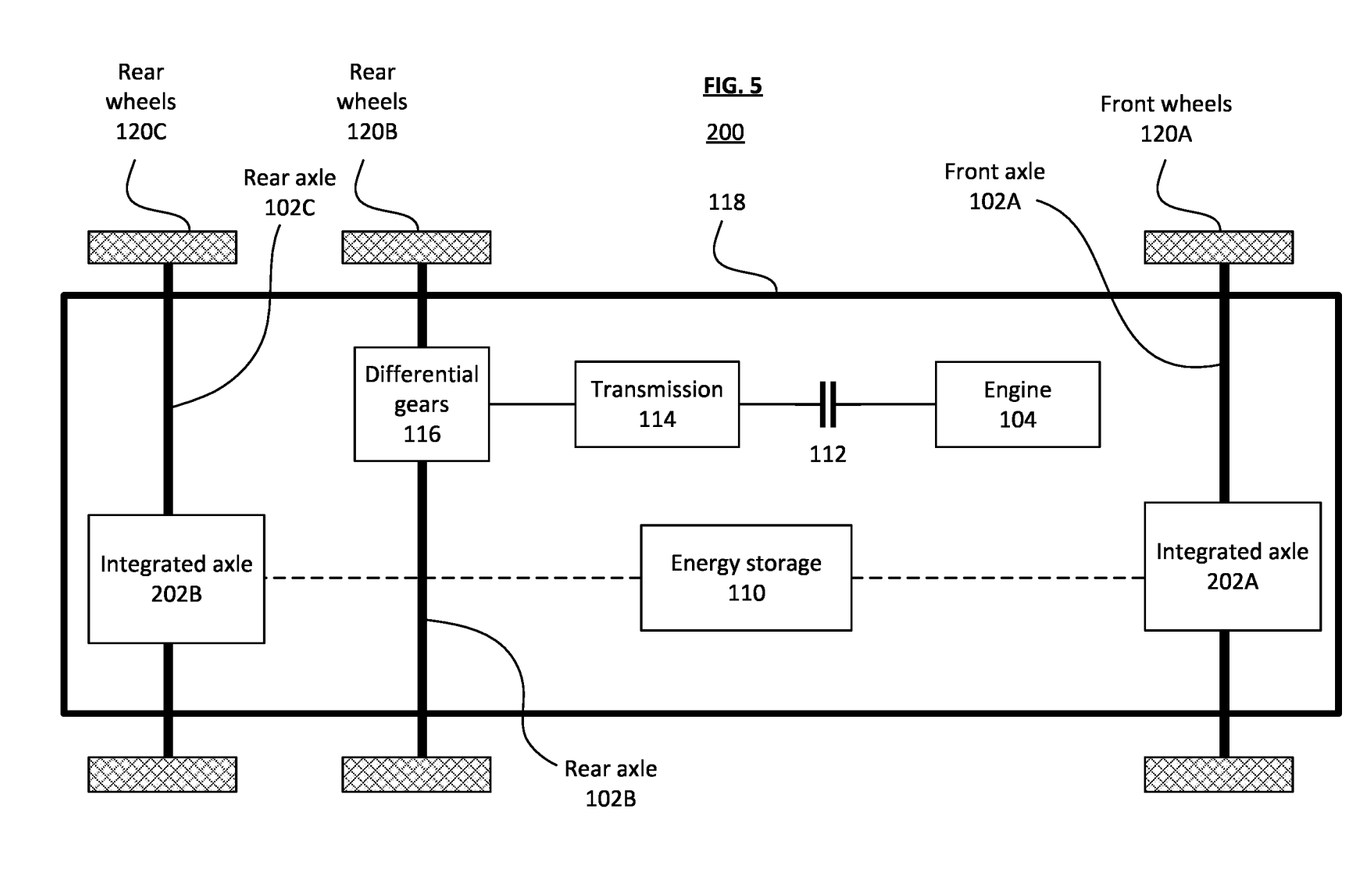
FIG. 5 is a schematic diagram of an example of a three-axle multi-mode adjustable hybrid vehicle system with integrated front axle, according to embodiments disclosed herein.
Figure 6:
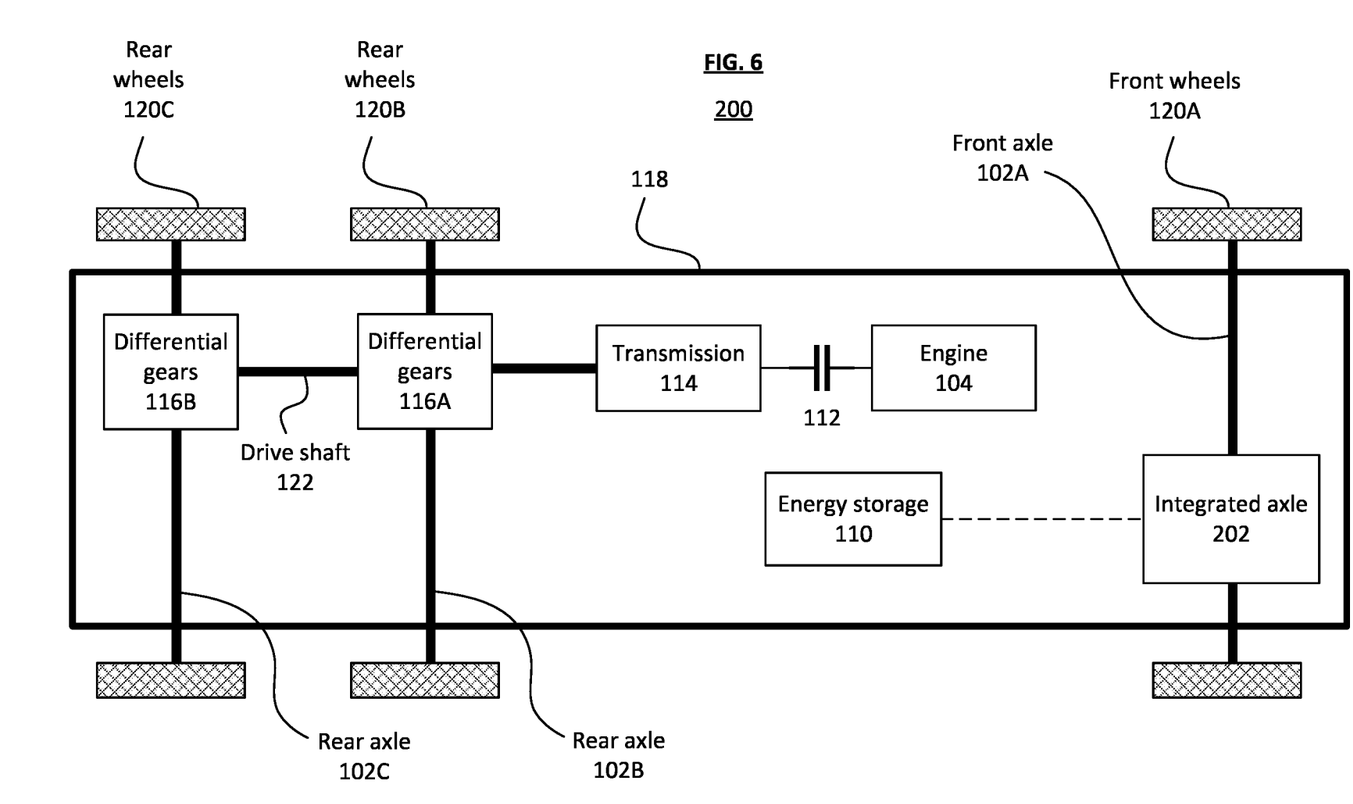
FIG. 6 is a schematic diagram of an example of a three-axle multi-mode adjustable hybrid vehicle system with integrated front axle, according to embodiments disclosed herein.
Figure 7:
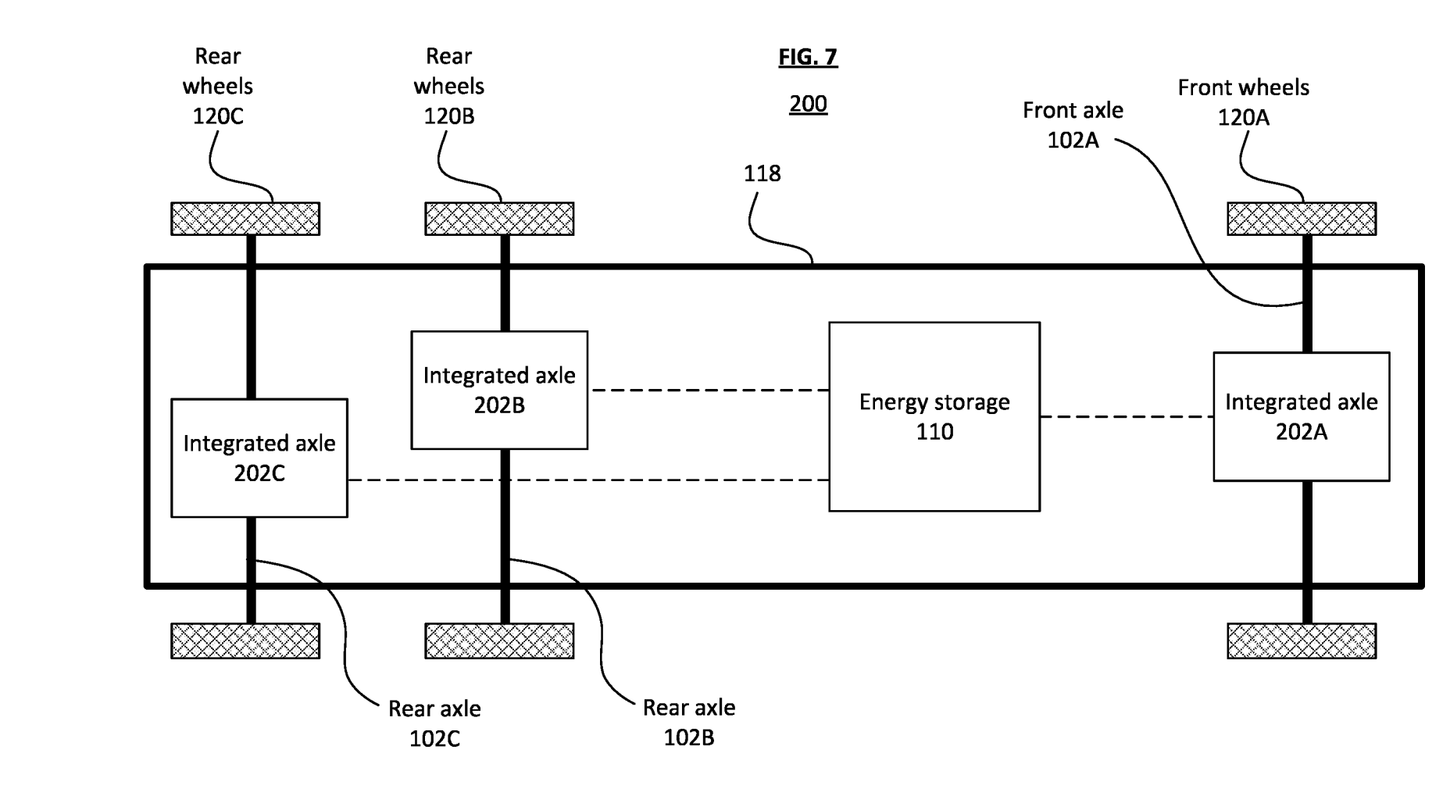
FIG. 7 is a schematic diagram of an example of a three-axle multi-mode adjustable hybrid vehicle system with integrated front axle, according to embodiments disclosed herein.

FIGS. 5 through 7 show examples of the system 200 where more than two axles (and in effect, more than four wheels) are implemented, with different combinations of integrated electrical axles and engine-powered axles implemented therein. It is to be understood that these figures are provided for illustrative purposes only, such that any additional number of axles may be implemented according to the need of the vehicle and its operation.

FIG. 5 shows an example of the system 200 which incorporates three axles 102A, 102B, and 102C, of which two of them, the front axle 102A and the rear axle 102C, have integrated axles 202A and 202B, respectively, coupled therewith. The other axle (rear axle) 102B is coupled with the engine 104 via the clutch 112, transmission 114, and differential gears 116 as shown. The integrated axles 202A and 202B are electrically powered by the energy storage 110.

FIG. 6 shows an example of the system 200 with three axles 102A, 102B, and 102C, but instead of two integrated axles, only the front axle 102A is coupled with the integrated axle 202, and the two remaining rear axles 102B and 102C are coupled with differential gears 116A and 116B, respectively. The differential gears 116A and 116B are coupled with each other via the drive shaft 122 which may operate both of the gears simultaneously, using the power provided by the engine 104 and transferred through the transmission 114. As such, the rear axles 102B and 102C may be coupled with each other via the drift shaft 122.

FIG. 7 shows an example of the system 200 with all three axles 102A, 102B, and 102C being powered electrically using the energy storage 110. That is, there are three integrated axles 202A, 202B, and 202C for the three axles, each independently operable, as controlled by a controller (not shown). In all examples disclosed herein, the front axle 102A is always implemented with an integrated axle, but the remaining axles may have integrated axles, engine-powered axles, or a combination of both.

Figure 8:
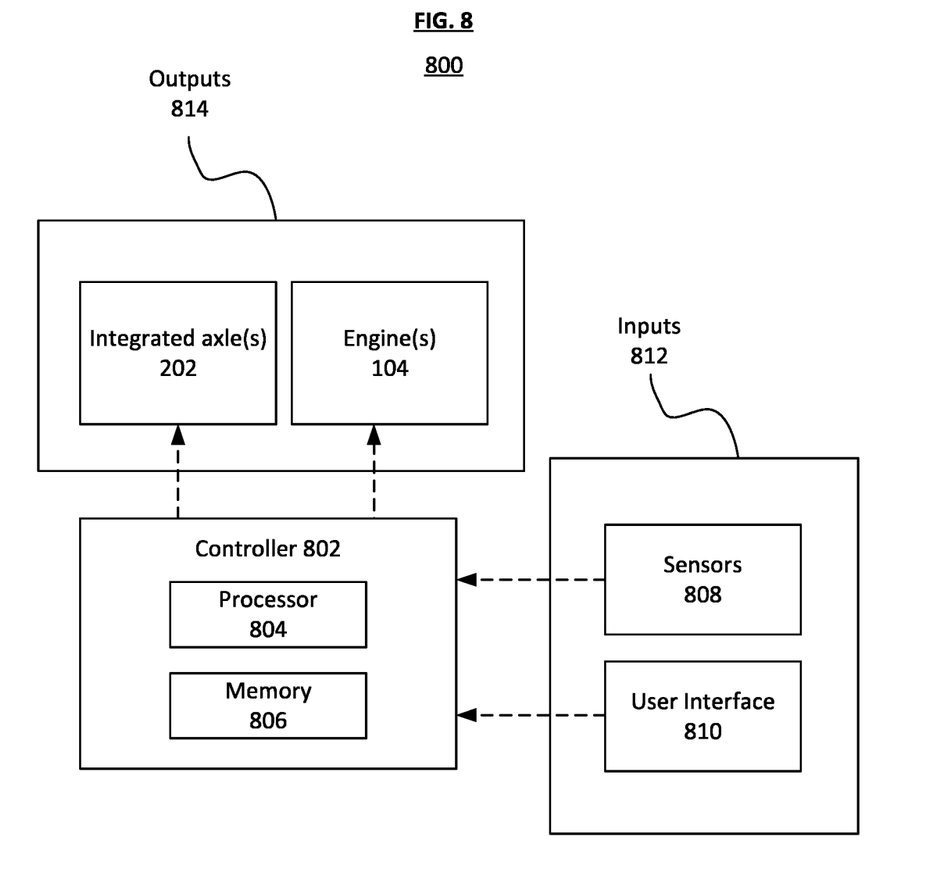
FIG. 8 is a schematic diagram of a controller operatively coupled with other components of the system, according to embodiments disclosed herein.

FIG. 8 shows an example of a control system 800 for the multi-mode hybrid vehicle system 200 as disclosed herein. The control system 800 includes a controller (multi-axle system controller) 802 which receives inputs 812 and controls the outputs 814. The controller 802 includes a processor 804 and a memory unit 806. The processor may be a microprocessor, a microcontroller, or any other suitable types of processing device or controller as known in the art. The controller 802 controls the operation of the integrated axle(s) 202 and engines 104 over communication lines, for example. It should be understood, however, that communication between controller and the integrated axle(s) and engine(s) may alternatively, or in addition, be performed wirelessly.

It should be understood that, in some embodiments, the controller 802 may form a portion of a processing subsystem including one or more computing devices having non-transient computer readable storage media, processors or processing circuits, and communication hardware. The controller 802 may be a single device or a distributed device, and the functions of the controller may be performed by hardware and/or by processing instructions stored on non-transient machine-readable storage media. Example processors include an application specific integrated circuit (ASIC), a field programmable gate array (FPGA), a digital signal processor (DSP), and a microprocessor including firmware. Example non-transient computer readable storage media includes random access memory (RAM), read only memory (ROM), flash memory, hard disk storage, electronically erasable and programmable ROM (EEPROM), electronically programmable ROM (EPROM), magnetic disk storage, and any other medium which can be used to carry or store processing instructions and data structures and which can be accessed by a general purpose or special purpose computer or other processing device.

Certain operations of the controller 802 described herein include operations to interpret and/or to determine one or more parameters. The parameters may be inputs 812 which may be information or data received from sensors 808 and/or user interface 810, among other means of providing inputs. The sensors may be any suitable sensor that can measure any change or increase in the load of the vehicle or the load applied on the vehicle. The sensors may include, but are not limited to, weight sensors which detect the physical weight of the vehicle and/or its cargo, gyroscopes which detect the incline or decline in which the vehicle may be traveling, and altimeters which detect the altitude or change in altitude as the vehicle travels, among others.

Interpreting or determining, as utilized herein, includes receiving sensor values by any method known in the art, including at least receiving values over communication lines, from a datalink, network communication or input device, receiving an electronic signal (e.g. a voltage, frequency, current, or pulse-width-modulation signal) indicative of the value, such as the current and expected loads of a vehicle as well as user's preference or whether the rear axles are approaching or reaching their performance limit, for example, as further explained herein, receiving a computer generated parameter indicative of the value, reading the value from a memory location on a non-transient machine readable storage medium, receiving the value as a run-time parameter by any means known in the art, and/or by receiving a value by which the interpreted parameter can be calculated, and/or by referencing a default value that is interpreted to be the parameter value.

The above-described embodiments of the technology described herein can be implemented in any of numerous ways. For example, the embodiments may be implemented using hardware, software or a combination thereof. When implemented in software, the software code (or software algorithm) can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone or any other suitable portable or fixed electronic device.

Also, a computing device may have one or more input and output devices. These devices can be used, among other things, to present the user interface 810 (which may be an output device as well as an input device). Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Such computing devices may be interconnected by one or more networks in any suitable form, including as a local area network, a controller area network, or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosed embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed herein. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of the disclosure, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Figure 9:
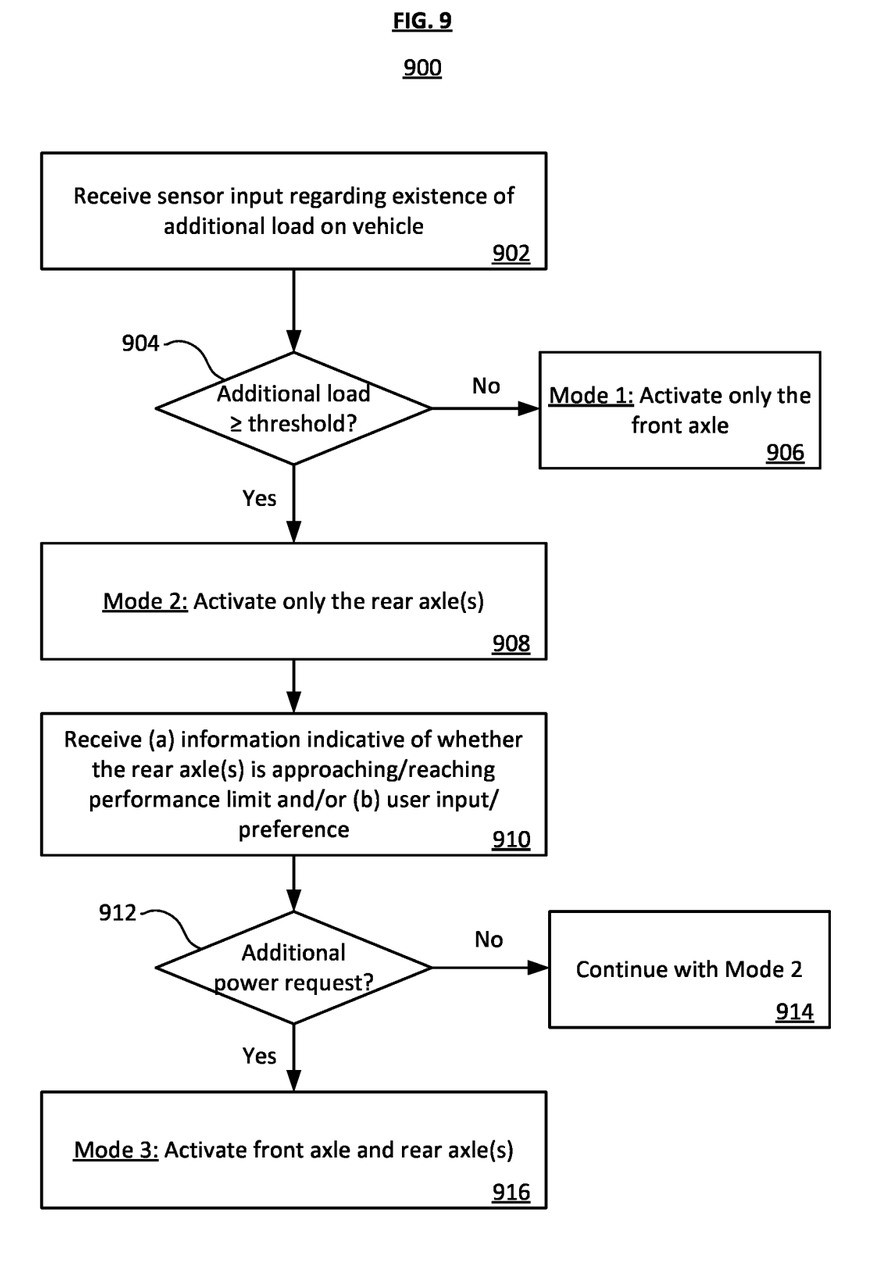
FIG. 9 is a flow chart illustrating a method of operating the multi-mode adjustable hybrid vehicle system, according to embodiments disclosed herein.

Referring now to FIG. 9, a high level method or process 900 for controlling the multiple axles in a vehicle system, including the front axle that is implemented with an integrated axle, using the controller as disclosed herein. The vehicle may be a bus configured to carry passengers and/or luggage, a pickup truck configured to carry a large load such as another vehicle or vehicles (including but not limited to cars, boats, motorcycles, etc.), or a truck or tractor configured to carry one or more trailers or cargos, among others. In step 902, the controller receives sensor input regarding the existence of additional load on the vehicle. The additional load may be defined as the load that is measured or detected in addition to the inherent load of the vehicle (such as the load of the vehicle itself and an initial load of the vehicle which may include, for example, a driver and a fuel tank that has been recently filled).

In step 904, the controller determines whether the additional load surpasses or exceeds a predetermined load threshold (or whether the total load is equal to or greater than a load threshold). The load threshold may be determined based on the usage of the vehicle and may vary in value between a vehicle that is only used for carrying passengers and a vehicle that is used for carrying heavier loads such as another vehicle(s). In some examples, the load threshold may be defined by the number of passengers, the amount of additional power that is requested (e.g., when the vehicle is driving on an incline), the total weight of the object(s) to be carried or transported (such as a trailer, container, another vehicle, etc.), among others. The load threshold may be defined in weight as measured (kg), in percentage or percentage increase in the weight of the vehicle in its original or unloaded state, or in force as measured (Newtons), for example. The load threshold may be determined manually or may be preset according to manufacturer's specification. The load threshold may be determined or adjusted automatically in view of past usage information (usage history), route information (GPS or navigator), or any other suitable information or data that can be used to determine how much load the vehicle can handle before needing the additional power to accommodate the increase in the load.

Upon determining that the additional load that is detected is below the threshold, the controller enters or selects "Mode 1" (first operation mode) in step 906, which is when only the front axle that is coupled with the integrated axle is activated, whereas the other axles are deactivated (not powered by either the electrical energy storage or the engine). Otherwise, in step 908, the additional load is determined as exceeding the threshold, and the controller enters or selects "Mode 2" (second operation mode) in which only the rear axle or axles are activated, with the front axle that is coupled with the integrated axle, being deactivated. As used herein, a "rear axle" is defined as any axle that is located behind the front or frontmost axle. Therefore, the "rear axle" as used herein may refer to any intermediate axle that is located between the front/frontmost axle and the rearmost axle, as well as the rearmost axle itself.

In step 910, the controller receives (a) data or information indicative of whether the rear axle(s) is approaching or reaching its performance limit, and/or (b) user input or information indicative of user preference with regards to which axle(s) to activate. The data or information of (a) may include input data from sensor(s) operatively coupled with the rear axle(s) to detect certain conditions of each rear axle, such as degradation in the axle or the wheels, lack of air pressure in the wheels, inadequate response from the axle after control commands are provided to the axle, possible malfunctioning of the axles due to damages inflicted on the axle components or the wheels, or any other suitable indicators of the axle approaching or reaching its performance limit.

In step 912, the controller determines if additional power request is received. The controller determines which mode to enter in view of both the existence of additional power request and the received data from step 910. For example, if there is no additional power request being received, the controller proceeds to step 914 and maintains operating in "Mode 2" as determined in step 908. In some examples, regardless of which information or data is received in step 910, the controller maintains the current mode so long as there is no additional power being requested. In some examples, based on the information received that indicates that the rear axle(s) is approaching or reaching its performance limit, the controller may issue a notification or warning to notify the user of a potential problem in the vehicle's axle(s) to fix during the next maintenance, but the controller performs no mode change unless the user specifically instructs the controller to do so.

Otherwise, if there is additional power request as determined in step 912, the controller selects or switches to operate in "Mode 3" (third operation mode) as shown in step 916, which is when the front axle is activated in addition to the rear axle(s) which have been activated in step 908. Therefore, the front axle that has the electrically powered integrated axle is capable of providing the additional power upon detecting that the rear axle(s) may be approaching or reaching its performance limit, and/or upon receiving the user input or user preference. User input may include instructions from the user (e.g., driver) to specifically use all available axles to provide as much torque as possible for the vehicle operation, for example by activating the accelerator of the vehicle. This may be due to the vehicle approaching an incline in the road or the weather making the road slippery, for example, so as to requires such additional torque and power. In some examples, such determination may be performed automatically by the controller instead of waiting for a user input, using any suitable means known in the art, based on suitable sensor inputs.

According to non-limiting examples of the embodiments, the vehicle may be classified as a Class 8 truck with a gross vehicle weight rating (GVWR) exceeding 33,000 lb (14,968 kg). Including but not limited to such cases, the load threshold may be defined as a range of weights such as from approximately 4000 kg to approximately 6000 kg (including but not limited to between approximately 4000 kg and 4500 kg, 4500 kg and 5000 kg, 5500 kg and 6000 kg, or any other suitable range or value therebetween) according to some examples. In some examples, the load threshold may be defined as a percentage of the initial (unloaded) vehicle weight (e.g., for a semi-tractor, weighing on average approximately 12,000 kg) without the added load, for example a range of percentages such as from approximately 30% to approximately 300% (including but not limited to between approximately 30% and 50%, 50% and 100%, 100% and 150%, 150% and 200%, 200% and 250%, 250% and 300%, or any other suitable range or value therebetween) of the initial vehicle weight. In some examples, the load threshold may be defined as the minimum force required to drive the loaded vehicle in a certain direction, such as uphill on an incline, which may be a range of force such as from approximately 15,000 Newtons to approximately 40,000 Newtons (including but not limited to between approximately 15,000 Newtons and 20,000 Newtons, 20,000 Newtons and 25,000 Newtons, 25,000 Newtons and 30,000 Newtons, 30,000 Newtons and 35,000 Newtons, 35,000 Newtons and 40,000 Newtons, or any other suitable range or value therebetween). It is to be understood that other types of vehicles (such as other types of trucks) and any other suitable range or value of weight, percentage, and/or force may be implemented in different embodiments as appropriate based on the aforementioned disclosure.

Advantages of implementing the systems and methods as disclosed herein include providing an improved means of control over the shared tractive effort by the front axle in certain types of vehicles when loaded, such as vehicles whose load (weight) may vary according to the operating condition or operating schedule of the vehicles. Examples of such vehicles, as previous explained, may include buses, trucks, and tractors, among others. In some examples, Class 8 tractors may implement such systems and methods such that traction control is better enabled or improved when a front traction axle of the tractor implements the aforementioned integrate axle. The front integrated axle would be the tractor's primary drive/traction system when not pulling a trailer. When loaded, the front axle would contribute to overall tractive effort, relieving the rear axle(s) somewhat, but the rear axles would still provide the primary/majority of tractive effort. This configuration may be applied in a 6×2 configuration (i.e., only one of the two rear axles receives power) or a 6×4 configuration (i.e., both of the tractor's rear axles are drive axles), for example. The ability to provide tractive effort through the front axle would also allow for an additional degree of freedom in vehicle traction control, possibly offering better control to avoid jack-knife situations and other articulated characteristics observed in such vehicles. Furthermore, the systems and methods disclosed herein may provide a better take-off, startability, or drivability for the vehicle, as there would be an additional axle to provide tractive effort. In some examples, the systems and methods disclosed herein may provide lower power requirements on all tractor axles such that a non-steer drive axle designed for Class 5 or 6 may be applied to a Class 8 vehicle (along with a front steer axle) to reduce lower production costs. In some examples, the systems and methods disclosed herein may provide all-wheel drive capability to a Class 8 tractor to improve vehicle dynamics and handling. At least some of these aspects may be applicable to Class 7 and Class 6 articulated vehicles as well. Additionally, "curb climb" capability of these vehicles may be enhanced, in which the vehicle climbs a curb, from standstill, with the wheel in contact with the curb.

While the embodiments have been described as having exemplary designs, the present embodiments can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A vehicle comprising:
    a steerable front axle mechanically coupled with a first motive power source comprising an integrated axle including an electric motor and a transmission operatively coupled with the steerable front axle;
    at least one rear axle mechanically coupled with a second motive power source and separately operable from the steerable front axle;
    a sensor configured to measure an additional load applied on the vehicle, the additional load including one or more of: an increased physical weight of the vehicle, an increased incline of a route traveled by the vehicle, or an altitude change as the vehicle travels; and
    a controller operatively coupled with the sensor, the first motive power source, and the second motive power source, the controller comprising a processing unit and a non-transitory memory storage medium having stored thereon instructions that, when executed by the processing unit, cause the processing unit to:
        receive measurement data from the sensor associated with be additional load applied on the vehicle;
        select, based on the measurement data, (a) a first operation mode of activating only the first motive power source or (b) a second operation mode of activating only the second motive power source, to operate the vehicle in view of the additional load; and
        activate, based on the first operation mode or the second operation mode that is selected, the first motive power source or the second motive power source to operate the vehicle.

2. The vehicle of claim 1, wherein the instructions, when executed by the processing unit, further cause the processing unit to:
    in response to determining, based on the measurement data, that the additional load applied on the vehicle is equal to or greater than a threshold value, select (b) the second operation mode.

3. The vehicle of claim 2, wherein the instructions, when executed by the processing unit, further cause the processing unit to:

receive information indicative of whether the second motive power source is approaching or reaching a performance limit in response to operating in the second operation mode;

select, based on the information that is received, (c) a third operation mode of activating both the first and second motive power sources; and activate both the first and second motive power sources to operate the vehicle.

4. The vehicle of claim 2, wherein the instructions, when executed by the processing unit, further cause the processing unit to:

receive a user input requesting additional power to operate the vehicle;

select, based on the user input that is received, (c) a third operation mode of activating both the first and second motive power sources; and activate both the first and second motive power sources to operate the vehicle.

5. The vehicle of claim 1, wherein the second motive power source comprises an engine and a second transmission coupled with the at least one rear axle.

6. The vehicle of claim 1, wherein the second motive power source comprises a second integrated axle including a second electric motor and a second transmission operatively coupled with the at least one rear axle.

7. The vehicle of claim 1, wherein the at least one rear axle includes at least a first rear axle and a second rear axle.

8. The vehicle of claim 7, wherein the first rear axle is mechanically coupled with the second motive power source and the second rear axle is mechanically coupled with a third motive power source.

9. The vehicle of claim 8, wherein the second motive power source comprises an engine and a second transmission coupled with the first rear axle, and the third motive power source comprises a second integrated axle including a second electric motor and a third transmission operatively coupled with the second rear axle.

10. The vehicle of claim 8, wherein the second motive power source comprises a second integrated axle including a second electric motor and a second transmission operatively coupled with the first rear axle, and the third motive power source comprises a third integrated axle including a third electric motor and a third transmission operatively coupled with the second rear axle.

11. The vehicle of claim 7, wherein the second motive power source comprises an engine and a second transmission coupled with the first rear axle, and the first rear axle is mechanically coupled with the second rear axle via a drive shaft.

12. A method of operating a vehicle comprising:

receiving, by a controller of the vehicle, measurement data from a sensor configured to measure an additional load applied on the vehicle, the additional load including one or more of: an increased physical weight of the vehicle, an increased incline of a route traveled by the vehicle, or an altitude change as the vehicle travels;

selecting, by the controller based on the measurement data associates the additional load, (a) a first operation mode of activating only a first motive power source or (b) a second operation mode of activating only a second motive power source, to operate the vehicle, wherein the first motive power source is mechanically coupled with a steerable front axle of the vehicle and comprises an integrated axle including an electric motor and a transmission operatively coupled with the steerable front axle, and the second motive power source is mechanically coupled with at least one rear axle of the vehicle and is separately operable from the steerable front axle; and activating, by the controller based on the first operation mode or the second operation mode that is selected, the first motive power source or the second motive power source to operate the vehicle in view of the additional load.

13. The method of claim 12, further comprising:

in response to determining, based on the measurement data, that the additional load applied on the vehicle is greater than a threshold value, selecting, by the controller, (b) the second operation mode.

14. The method of claim 13, further comprising:

receiving, by the controller, information indicative of whether the second motive power source is approaching or reaching a performance limit in response to operating in the second operation mode;

selecting, by the controller based on the information that is received, (c) a third operation mode of activating both the first and second motive power sources; and activating, by the controller, both the first and second motive power sources to operate the vehicle.

15. The method of claim 13, further comprising:

receiving, by the controller, a user input requesting additional power to operate the vehicle;

selecting, by the controller based on the user input that is received, (c) a third operation mode of activating both the first and second motive power sources; and activating, by the controller, both the first and second motive power sources to operate the vehicle.

16. A non-transitory memory storage medium having stored thereon instructions that, when executed by a processing unit, cause the processing unit to perform the method of claim 12, wherein the processing unit is implemented in the controller.

17. A controller comprising:

a processing unit; and a non-transitory memory storage medium having stored thereon instructions that, when executed by the processing unit, cause the processing unit to:

receive measurement data from a sensor configured to measure an additional load applied on a vehicle, the additional load including one or more of: an increased physical weight of the vehicle, an increased incline of a route traveled by the vehicle, or an altitude change as the vehicle travels;

select, based on the measurement data associate with the additional load, (a) a first operation mode of activating only a first motive power source that is mechanically coupled with a steerable front axle of the vehicle and comprises an integrated axle including an electric motor and a transmission operatively coupled with the steerable front axle, or (b) a second operation mode of activating only a second motive power source mechanically coupled with at least one rear axle that is separately operable from the steerable front axle, to operate the vehicle; and activate, based on the first operation mode or the second operation mode that is selected, the first motive power source or the second motive power source to operate the vehicle in view of the additional load.

18. The controller of claim 17, wherein the instructions, when executed by the processing unit, further cause the processing unit to:

in response to determining, based on the measurement data, that the additional load applied on the vehicle is equal to or greater than a threshold value, select (b) the second operation mode.

19. The controller of claim 18, wherein the instructions, when executed by the processing unit, further cause the processing unit to:

receive information indicative of whether the second motive power source is approaching or reaching a performance limit in response to operating in the second operation mode;

select, based on the information that is received, (c) a third operation mode of activating both the first and second motive power sources; and activate both the first and second motive power sources to operate the vehicle.

20. The controller of claim 18, wherein the instructions, when executed by the processing unit, further cause the processing unit to:

receive a user input requesting additional power to operate the vehicle;

select, based on the user input that is received, (c) a third operation mode of activating both the first and second motive power sources; and activate both the first and second motive power sources to operate the vehicle.

* * * * *